US00RE35926E

United States Patent [19]

Hagen

[11] E Patent Number: Re. 35,926

[45] Reissued Date of Patent: Oct. 20, 1998

[54] VENETIAN- OR PLEATED BLINDS, PARTICULARLY FOR MULTIPLE PANE INSULATING GLASS WINDOW

[75] Inventor: Helge Hagen, Frederikshavn, Denmark

[73] Assignee: Nordicon Develop ApS, Mariager, Denmark

[21] Appl. No.: 368,424

[22] Filed: Jan. 4, 1995

(Under 37 CFR 1.47)

Related U.S. Patent Documents

Reissue of:

[64] Patent No.: 5,178,200
Issued: Jan. 12, 1993
Appl. No.: 892,731
Filed: May 29, 1992

U.S. Applications:

[63] Continuation of Ser. No. 703,110, May 22, 1991, abandoned.

[30] Foreign Application Priority Data

Dec. 14, 1990 [MO] Macau ..... 905416

[51] Int. Cl.[6] ..... E06B 3/32

[52] U.S. Cl. ..... 160/107; 160/34

[58] Field of Search ..... 160/107, 34, 171, 160/176.1, 177, 174, 84.04, 84.05, 84.06, 170, 32, 33

[56] References Cited

U.S. PATENT DOCUMENTS

| | | | |
|---|---|---|---|
| 2,401,770 | 6/1946 | Nardulli . | |
| 2,557,978 | 6/1951 | Krumm | 160/107 X |
| 3,101,113 | 8/1963 | Kim . | |
| 3,141,497 | 7/1964 | Griesser . | |
| 3,153,819 | 10/1964 | Bond . | |
| 3,201,832 | 8/1965 | Hordis et al. . | |
| 3,269,453 | 8/1966 | Vecchiarelli et al. . | |
| 3,308,873 | 3/1967 | Dotto . | |
| 3,352,349 | 11/1967 | Hannequin . | |
| 3,835,911 | 9/1974 | Horst . | |
| 4,245,435 | 1/1981 | Ulbricht . | |
| 4,884,613 | 12/1989 | Komori et al. . | |
| 4,979,552 | 12/1990 | Van Der Zanden | 160/107 |

FOREIGN PATENT DOCUMENTS

| | | | |
|---|---|---|---|
| 157500 | 5/1982 | Denmark . | |
| 158054 | 3/1990 | Denmark . | |
| 171116 | 2/1986 | European Pat. Off. . | |
| 1509809 | 12/1964 | Germany . | |
| 3904763 | 10/1989 | Germany . | |
| 89203 | 3/1957 | Norway | 160/107 |
| 125743 | 10/1972 | Norway . | |
| 152059 | 4/1985 | Norway . | |
| 216624 | 10/1967 | Sweden . | |
| 311219 | 6/1969 | Sweden . | |
| 400816 | 4/1966 | Switzerland . | |
| 672658 | 12/1989 | Switzerland . | |
| 986529 | 3/1965 | United Kingdom . | |
| 1081976 | 12/1967 | United Kingdom . | |

*Primary Examiner*—Blair Johnson
*Attorney, Agent, or Firm*—Lee, Mann, Smith McWilliams, Sweeney & Ohlson

[57] ABSTRACT

Venetian blinds, pleated blinds or the like, suspended in a cord drive system mounted in a housing, adapted to be positioned between the glass panes in a double glass window, particularly an insulating glass unit. The cord drive system is connected with a laterally arranged, longitudinal support shaft (16), mounted in the housing, which support shaft (16) is arranged rotatable as well as laterally displaceable in axial direction in order to accomplish winding and dewinding of the cord drives (10.12;66.68;78.78') in one single layer along parts of the support shaft, in order to hoist or ower the blind, respectively. The support shaft (16) is provided with threads in engagement with a threaded member (24.28), which is not rotatably connected in said housing (2), effecting that said support shaft (16) by rotation synchonously is being moved in axial direction.

14 Claims, 4 Drawing Sheets

VENETIAN- OR PLEATED BLINDS, PARTICULARLY FOR MULTIPLE PANE INSULATING GLASS WINDOW

Matter enclosed in heavy brackets [ ] appears in the original patent but forms no part of this reissue specification; matter printed in italics indicates the additions made by reissue.

This application is a continuation of application Ser. No. 07/703,110 filed May 22, 1991, now abandoned.

BACKGROUND

The present invention relates in general to hoistable and lowerable venetian- or pleated blinds, designed and adapted for mounting between the glass panes in double glass pane windows, particularly for multiple glass insulating units. The invention can be utilized for venetian blinds as well as for pleated blinds.

For the sake of simplicity, one shall for the various types of blinds and screens which fall within the scope of the invention, in the following specification including the claims, as general designation for the products involved use the word "blinds", unless a different word is used to designate a particular product.

A number of various proposals for such blinds is known. As illustrative for the prior art, one can refer to U.S. Pat. Nos. 3,292,309, 3,153,819, 2,530,218, 4,459,778 and 3,835,911.

To make various types of blinds designed for mounting between two fixedly mounted glass panes, such as between two panes of glass in an insulating glass unit, offers a number of special problems. Firstly, the available space, in transverse direction, for mounting the blind unit is rather limited, and further, the blind structure must have a rather durable, operationally reliable and maintenance free construction, inasmuch as the blind unit including the system for hoisting and lowering the blind is not readily accessible for repair or replacement, but instead normally will require replacement of the entire glass unit if malfunctions should occur. Furthermore, the blind must be simple and durable in operation by unskilled inhabitants of the building in question.

SUMMARY

The main object of the invention has thus been to provide a rather compact, mechanically simple and durable blind for mounting between the double glass panes in insulating glass units and the like.

A further object for the invention is to provide a constructional solution which makes possible hoisting as well as lowering of the blind, and also an angular positioning of the separate slats in connection with the venetian blind.

A further object for the invention is to provide a solution making it possible to operate the blind with one single operational means, in other words, a blind which can be manually operated with one single hand.

A further very important object of the invention is to provide a suspension system including a cord suspension or drive, which can be given a rather compact construction, such that the solution is especially adapted for mounting between the glass panes in an insulating glass unit.

A still further object for the invention is to provide a solution which makes it possible to arrange a forced or mechanically controlled two-way hoisting and lowering of the blind. Such a solution may be desirable for several reasons, namely firstly because such a blind solution is very well adapted for mounting between two pane glasses which are having a position tilted from the vertical position, for instance in connection with glass roofing or the like, solutions which today are increasingly in use. Such solutions offer furthermore an added operational reliability in addition to that the occurence of sound creations due to contact between the blind and the inside surface of the glass panes may be avoided.

The window blind structure in accordance with the invention is of the kind provided with a cord suspension drive, which is mounted in a housing, and which is particularly adapted to be positioned between the glass panes in a double glass pane window, particularly in insulating glass units, and whereby the blind is suspended in a cord drive or the like, by means of which the blind can be positioned in any desirable position relative to the window area, and the blind structure in accordance with the invention is generally characterized in that the cord suspension drive is connected to an elongated, transversely positioned support shaft, mounted in a housing, which shaft is arranged for rotating movement as well as being axially displaceable, operative to providing winding and unwinding of the cord drives connected to the shaft, substantially in one single layer along the support shaft.

In a preferred embodiment of the invention, the support shaft is provided with inwardly (hollow shaft) or outwardly positioned screw threads which stand in threaded connection with one or more threaded elements which are fixedly attached in the housing, resulting in that the support shaft by rotation simultaneously is being moved in axial direction.

The solution in accordance with the invention for suspending or mounting and maneuver of blinds, can be utilized in a number of various designs of venetian blinds and pleated blinds.

One embodiment of the invention, which can be utilized on different types of blinds, is characterized in that the cord drive consists of one single continuous cord, the respective ends of which are fixed to the support shaft in mutually laterally spaced positions, the cord running from one first fixed point on the shaft down through the blind on one side of same to a list or rail, arranged at the bottom of the blind, along said rail by means of sliding means or the like, mounted on both sides of the rail, and from there with a cord section leading up through the blind to one on the support shaft arranged, second fixed point for the other end of the cord.

A second embodiment of the invention which is particularly useful in connection with pleated blinds, is characterized in that the blind is suspended in two independent cord drive systems, each of which consists of a single cord, and in that the respective ends of each cord drive is attached on respective opposite sides of the support shaft relative to its longitudinal axis, having parallel cord runs which are running down through the blind and at the lower window frame element, for instance on a lower spacer element, runs in a 180° loop via transition means, and in that one of the cord runs in each of the cord drives is attached to an attachment point at the lower edge of the blind, having the effect that each cord run in each cord drive during the rotational movement of the shaft will be simultaneously wound and unwound from the shaft to the same extent, preserving a constant free length of the cord drives and the tension in same, simultaneously as the blind will be hoisted up or down in correspondence with the rotational direction of the shaft, having the effect that the movements of the blind will take place in a mechanically speaking controlled way in both directions.

A further embodiment of the invention, which is particularly useful in connection with venetian blinds, is characterized in that the blind is suspended in two cord drives, namely one system for lowering and hoisting of the blind, and one second cord drive system for angular positioning of the individual slats, and this solution is generally characterized in that the cord drives for angular positioning of the slats, are limited slideably connected with the support shaft. Hereby, the support shaft may, by rotation, be utilized for hoisting and lowering of the blind as well as for obtaining the desired angular positioning of the separate slats.

A known problem in connection with the mounting of blinds with cord drives, positioned between glass panes in insulated glass units, is that the accessible space is rather limited, implying that it is very difficult to design sufficiently effective and durable cord drive mechanisms. In accordance with some proposals, one has attempted to build in the cord drive system in the spacer element. Such solutions have not been successful. In other proposals, one has therefore mounted the cord drive mechanism in special housings, which are positioned below the spacer element in the window. A drawback with such solutions is, however, that the effective light area in the window thereby is reduced. A further important feature of the invention in this connection is that one is utilizing an especially designed spacer element which consists of two parts, namely a base part or inside part, and which constitutes the support for the blind including the cord drives, and a top part or external part which serves as a cover and which is positioned on the support part subsequent to that the cord drive systems have been mounted therein, resulting in that the cord drive mechanisms are confined in a closed box profile element. In connection with the invention, one is furthermore utilizing special corner keys, which in addition to providing a closure for the end parts of the box profile element, also serves as support means for the adjacent spacer element in the insulated unit on either side. The mentioned two-part box profile element for the cord drives constitutes thereby simultaneously the spacer element for the insulated glass unit. This is accomplished by the rather compact design of the cord drive mechanisms in accordance with the invention. For operation of the cord drive mechanism, one can use a solution where the drive shaft or an extension of same is extended out sideways through one of the corner keys in order to be connected to a motor drive or an manual mechanism positioned on the outside of the window, or on the adjacent frame or wall. Alternatively, the cord drives can be operated by means of an electric motor which can be designed in order to constitute an integral part of the support shaft.

BRIEF DESCRIPTION OF THE DRAWING

Some embodiments for window blinds in accordance with the invention shall in the following be described in detail, with reference to the accompanying drawings, wherein.

DESCRIPTION OF THE PREFERRED EMBODIMENTS

Figure 1:
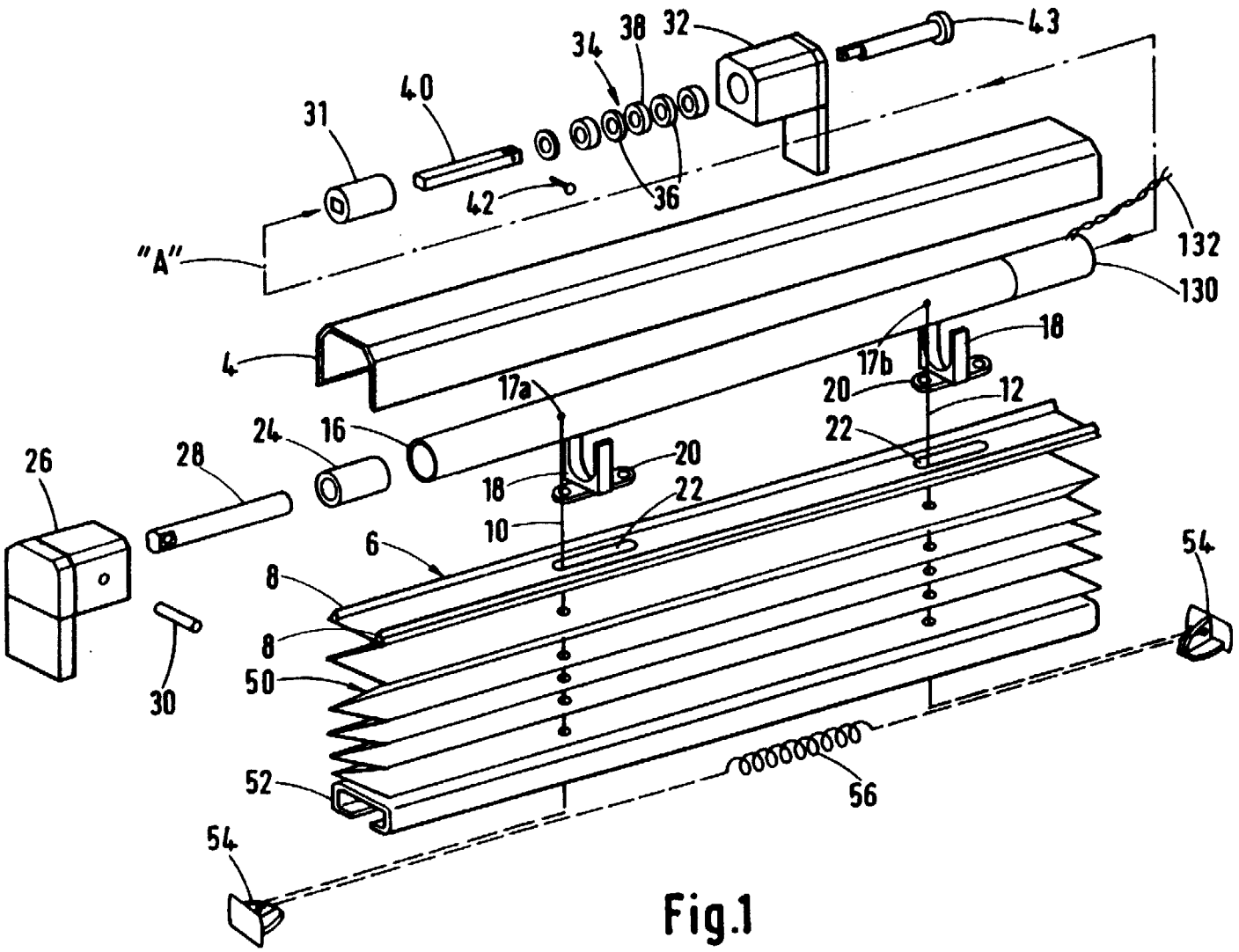
FIG. 1 is showing a fragmentary or exploded perspective view illustrating the construction of a pleated window blind in accordance with the invention, and particularly illustrating the design of the main parts of the cord drive mechanism.

The cord drive system in accordance with the invention shown in FIG. 1, is based upon the use of a longitudinal extending combined support and rotational shaft 16, (*support shaft or winding shaft*) which for all practical purposes extends transversely all the way from one side of the insulating unit to the other side, and which together with the cord drive is built into a two-part box shaped profile element 2, consisting of a top part or cover 4 and a base part 6, and (*base plate*) which suitably is such configurated that the cover 4 can be snapped onto the base [part] *plate* 6 which in this connection is provided with a suitable longitudinal groove 8 on either side. The cord drive consisting of support cord sections 10 and 12 has one end fixed to the *support* shaft 16, which [shaft] *support 16* is supported in two or more saddle shaped bearings 18, 18, mounted on the base [part] *plate* 6 of the profile elements. The cords 10 and 12 extend through apertures 20 and further down through elongated slits 22, 22 in the base [part] *plate* 6 of the profile element.

At one end, the support shaft 16 is attached to an inwardly screw threaded drive element 24. Outside the end of the *support* shaft 16, is arranged a corner element 26 wherein is supported a not rotatable, screw threaded stem 28, provided with an aperture through which is positioned a locking spline 30. The aperture has greater diameter than the spline, such that the stem 28 is somewhat loosely supported.

The *support* shaft 16 is by means of the screw threaded drive element 24 standing in threaded engagement with the stem 28.

The parts which are positioned at the other end of the *support* shaft, i.e. the right side in the figure, are shown separately in a fragmentary view positioned above the *support* shaft, and are for the sake of clarity indicated with a dotted line designated with the letter "A".

At the other end of the *support* shaft 16 is attached a bushing 31, having a square aperture [32]. The bushing 31 is attached in such a way that it cannot rotate relative the *support* shaft 16.

In the right side corner key 32, which is provided with a throughgoing aperture, is positioned a packing/sealing unit consisting of two bearing rings 34, and further two special gaskets 36, and finally distance piece 38. [The support] *An extension* shaft [16] *43* (*winding shaft extension*) extends through the corner key 32, and at the outer end of the *extension* shaft, which is available on the outside of the insulated glass unit, is arranged a groove with a rotation means adapted for connection to a manual or electric operation mechanism which thereby extends into the inside of the window, thereby enabling operation of the blind. These implements, which may be of in per se known construction, are assumed to be unnecessary to show and describe.

The [support] *extension* shaft [16] *43*, and a square shaft 40, are coupled together with a locking spline 42. The square shaft 40 extends into a bushing 31, having a square aperture.

When the *extension* shaft 43 is imparted a rotational movement, the movement is transferred to the support shaft 16. By means of the screw drive 24 and the stem 28, the support shaft 16 is simultaneously imparted an axial movement. Inasmuch as the cords 10 and 12 are fixed to the *support* shaft 16, and further, in that the cords are guided through the openings 20, 22 in the bearings 18, 18, the combined rotational/axial movement of the *support* shaft 16 is effecting that the cords are being wound on or unwound in parallel fashion in one single layer on the support shaft, simultaneously as the cords will maintain their vertical position relative to the apertures 20, 22.

The upper end of the pleated fabric 50 is attached to the underside of the base plate 6 in the box shaped profile element, and the bottom or lowermost part of the pleated fabric is attached to a bottom rail 52. The drive cords 10 and 12 extend from the *support* shaft 16 down through the apertures 20, 22, and then further down through apertures made in each of the slats in the accordion-like pleated fabric, and from there down to the bottom rail 52, whereat the cords are passing over slide members (not shown) and from these out to the opposing side edges of the bottom rail 52 out to terminating members 54 likewise provided with slide members or the like (the slide members 54 are in the figure shown in not mounted position for the sake of clarity). The cords run from there as shown, back to the center portion of the pleated fabric, at which point the two cord ends are attached together via a spring 56 serving as a combined tension means and shock absorber. By arranging the cord drives in this fashion, the blind will be self-adjusting inasmuch as each time the blind is being lifted up to the uppermost position in the shape of a folded package below the basis element 6, possible maladjustments in the pleated blind will be re-adjusted.

Figure 3:
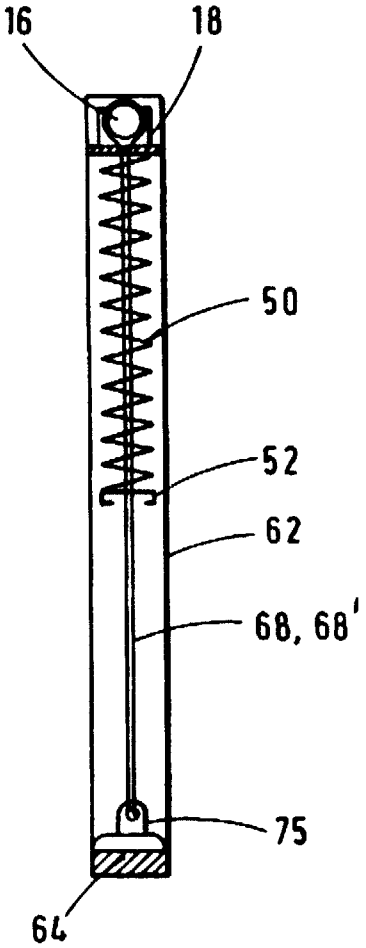
FIGS. 2 and 3 are showing a front view and an end view of a pleated blind, respectively, which has substantially the same construction as the blind shown in FIG. 1, but which has an alternative solution for the cord drive system, whereby is obtained a mechanically forced movement of the pleated blind from a closed to an open position.
Figure 2:
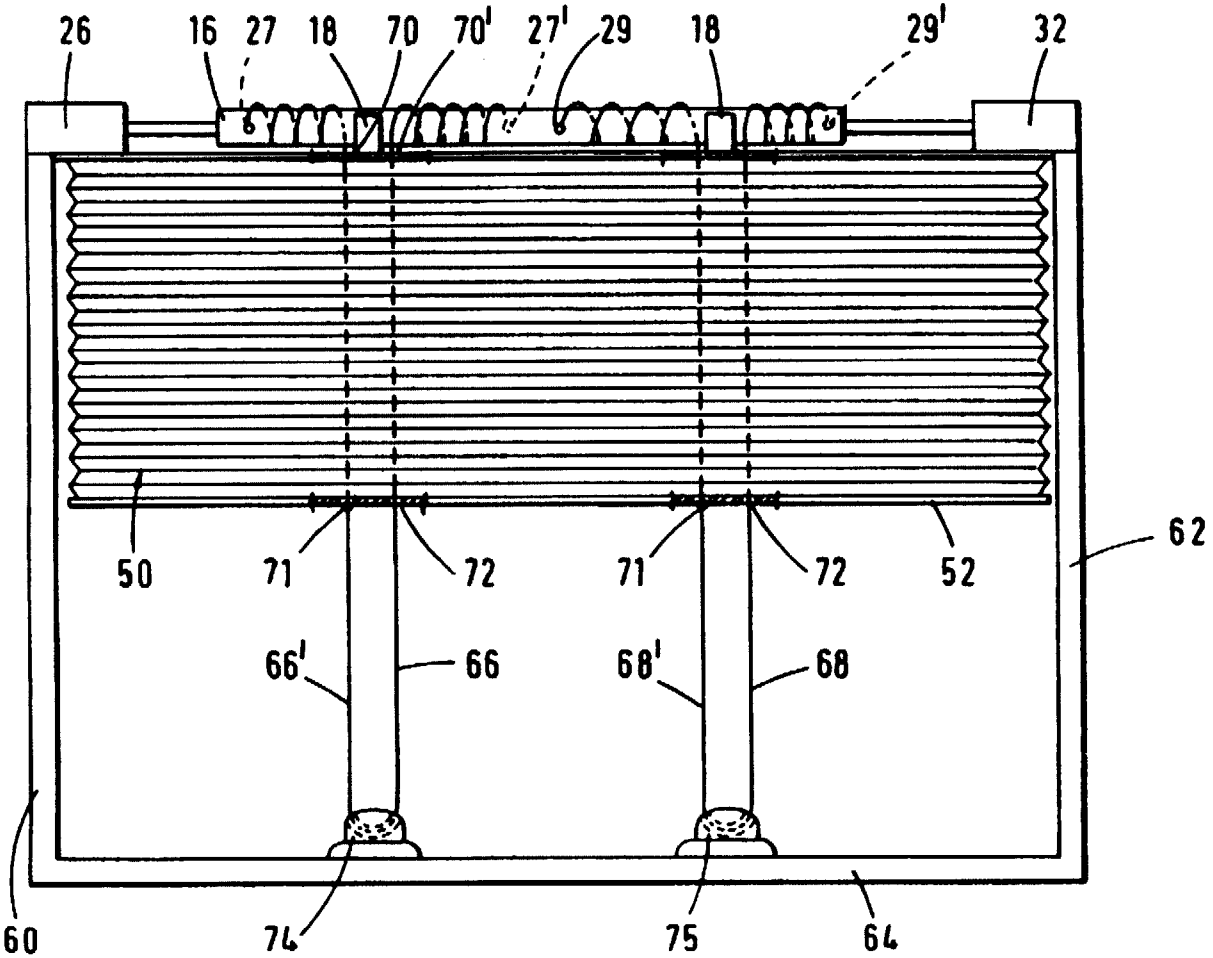

FIGS. 2 and 3 show a front view and an end view, respectively, of a modified embodiment for a pleated blind in accordance with the invention. The cord drive system, including the simultaneously rotating and longitudinally moving support shaft 16 together with the parts which are shown in the uppermost part of FIG. 1, corresponds to the construction shown at the top of FIG. 1, while the embodiment shown in FIG. 3 relates to an alternative cord drive mechanism. The two corner keys 32 and 26, as also shown in FIG. 1, are attached to spacer elements 60, 62, positioned on each side of the insulated glass unit, respectively, and which spacer elements at the bottom ends are attached to the lowermost positioned spacer element 64. The embodiment shown in FIGS. 2 and 3 constitutes a special embodiment or further development of the solution shown in FIG. 1, since here are utilized double or two couples of cord drives, respectively designated 66, 66' and 68, 68'. Both ends of each cord drive or cords are however in this embodiment attached to the shaft 16 on the diametrically opposite side of same, and furthermore on the diametrically opposite sides of the bearings 18 and 20. Through this arrangement, the cord drives 66, 66'; 68, 68' will thereby always be wound and unwound on the support shaft simultaneously in opposite direction. The cord drives extend from the support shaft 16 down through apertures 70, 70' on either side of the bearings 18, 18. The cord drives or runs 66, 68 continue from here down through apertures in the blind, through holes 72, 72' in the bottom rail 52, and from there down to slide members 74, 75 or the like, positioned in special turning or reversing members 76, 76 mounted on the spacer element 64. One of the two cord drives or runs, for instance cord drive 68, 68', is attached to the bottom rail 52. During rotation of the shaft, the two cord drives or cord runs in each cord drive will thereby be wound and unwound simultaneously in opposite directions, simultaneously as the blind via the attachment point 71, 71 moves up or down. One has, in other words, provided a positive or mechanically guided winding (i.e., raising) and unwinding (i.e., lowering) of the blind. During the assembly of the various parts, one sees to it that the cord drives are adjusted with a suitable tension, so that the blind is not given a chance to contact the inside of the glass panes, even if the same are mounted in a tilted position. This embodiment is particularly suitable for insulated glass units which shall be mounted at an angle relative to the vertical plane.

Figure 4:
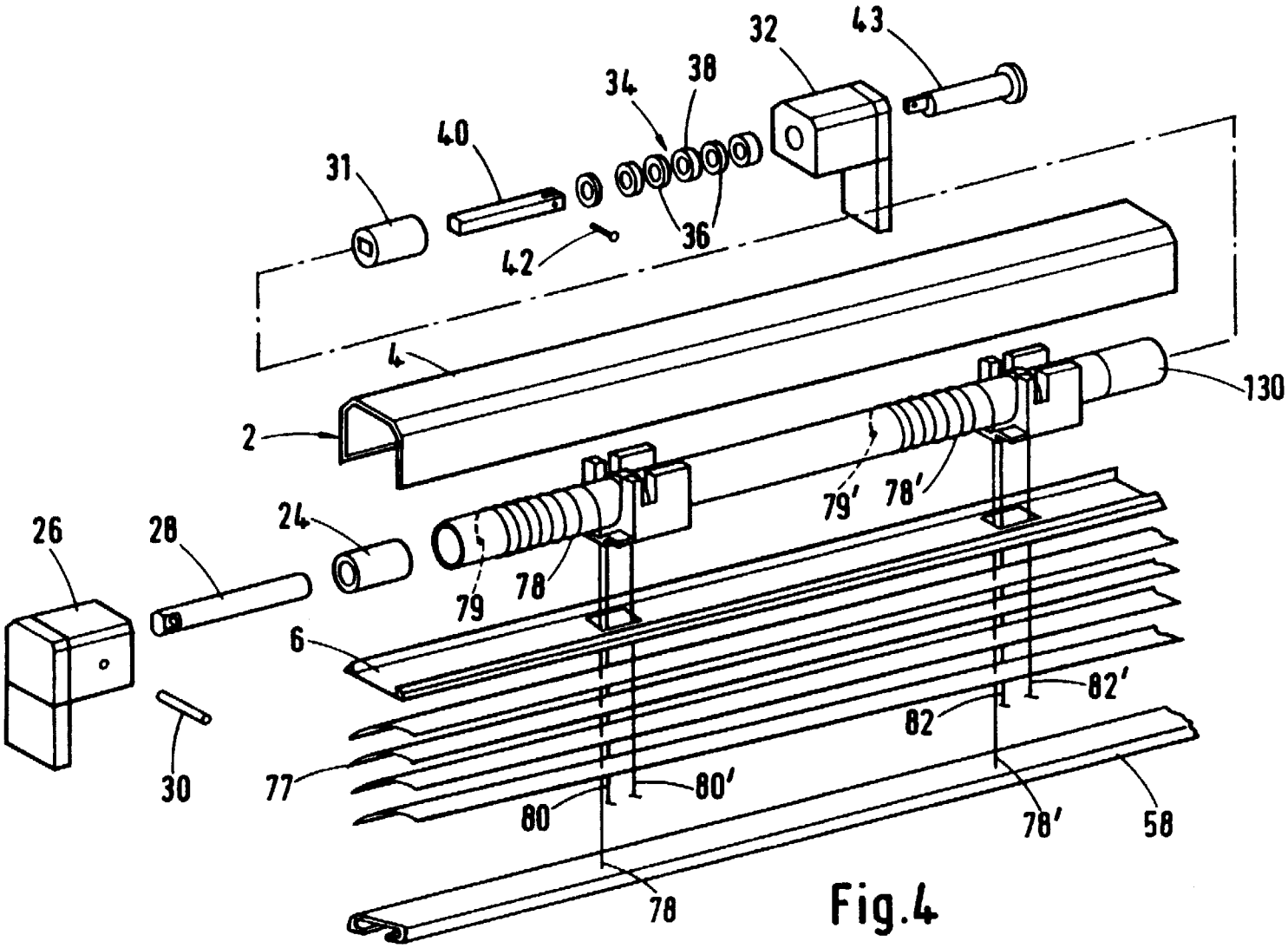
FIG. 4 is showing a fragmentary perspective view, similar to FIG. 1, of a second embodiment of the invention, wherein is used a venetian blind, and wherein the cord drive mechanism is so devised that one can obtain hoisting and lowering of the blind as well as rotation or angular positioning of each separate slat by means of one single manual maneouvering means.

FIG. 4 shows a fragmentary perspective view, similar to FIG. 1, of a further embodiment of the invention, where, in replacement of a pleated blind is utilized a venetian blind consisting of individual slats or foils 77, suspended with suitable mutual vertical distance, by means of couplewise cords or cord system 80,80'; 82,82', interconnected at each separate slat by means of transverse connecting cords or ladder strings. All parts of these cord drive systems, except for the cord drives and the blind, correspond to the construction shown in FIG. 1, and requires no repeated description, since in FIG. 4 are utilized the same reference numbers on the same parts, as appearing in FIG. 1. At each lateral side of the blind is on the support shaft 16 further provided cord drives 78,78', the one end of which is attached to the support shaft at the points 79,79', and extend down through apertures provided in each separate slat, and the other lower end of the cord is attached to the bottom rail 58. During rotation of the support shaft 16, the cord drive will be wound on, respectively unwound off the support shaft, simultaneously as the support shaft is laterally displaced effecting that the cord drives as shown will be wound, respectively unwound, in one single layer by the support shaft 16.

Figure 5:
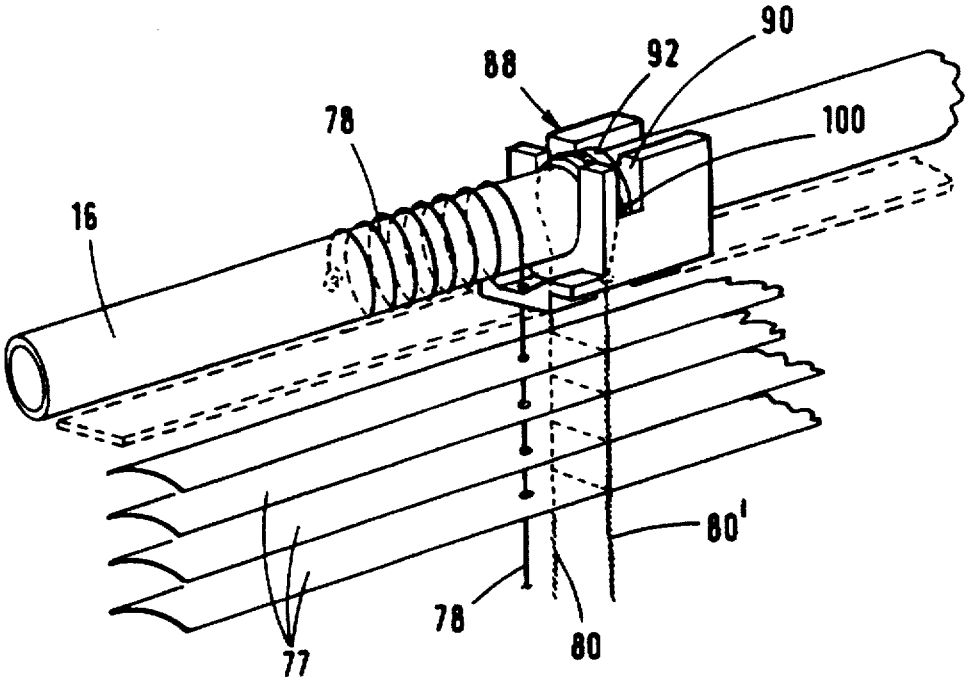
FIG. 5 is a detail view shown in an enlarged scale, which perspectively and in detail illustrates the cord drive mechanism utilized with the blind shown in FIG. 4.
Figure 6:
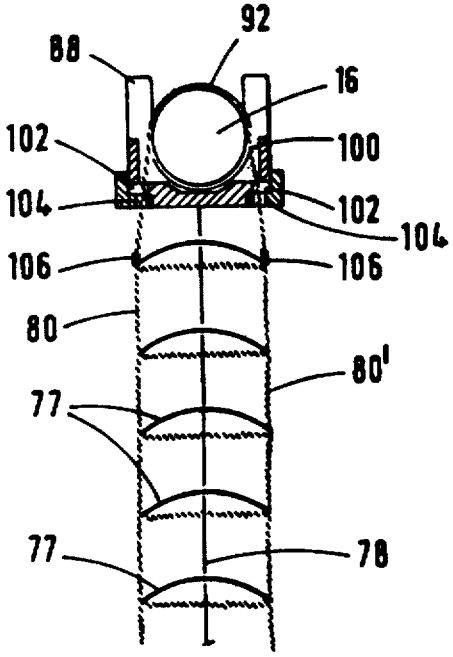
FIG. 6 is a schematic view which in a cross-sectional plane illustrates an alternative detail solution for the angular adjustment of the slats used in the blind shown in FIG. 3.

The special novelty of the blind solution in accordance with the invention shown in FIGS. 4 to 6, relates to the suspension of the blind in order to adjust the angular position of the slats, and thereby the light opening in the insulating unit, in a simple and practical fashion. For rotating or pivoting of each of the slats, the same are in known fashion suspended in couplewise cord drives 80,80', wherein one cord extends along opposite side edges of the slats, and the cords are, as previously mentioned, suitably connected with lateral cords 84, forming support for each separate slat 77,77, as shown in FIG. 6, so that the desired pivoting of the slats can be effected by providing an uneven or different pulling in each respective cord.

In accordance with the invention, the cord couple or couples 80,80' and 82,82', respectively, are arranged in a loop 100 extending around the support shaft, as best shown in FIG. 5, which in a perspective view illustrates one of the suspension systems, for instance the left shown in FIG. 4. The support shaft 16 is supported in a cradle-like bearing 88. The bearing cradle is provided with an circumferential slit 90, forming support for a slide ring 92, encompassing the support shaft and making possible a rotation of the support shaft and a displacement of same longitudinally, while the slide ring may be remaining immovable, i.e. it would not rotate together with the support shaft.

A preferred embodiment of the loop is shown in FIG. 6, showing a schematic cross-section, viewed against the bearing cradle 88. The shown loop 100 can consist of a suitable flexible material, for instance a textile material, plastics or possible metal, and it is as shown arranged in a loop 100, extending over the support shaft 16, or as shown along the said slide ring 92. The downwardly directed ends of the loop are guided through openings 102,102 in the bearing cradle 88 and adjacent openings 104 in the support profile base part 6 and are on the underside terminated with stoppers 106,106 simultaneously forming attachment points for the upper ends of the suspension cords 80,80'.

The suspension system for the blind shown in FIGS. 4 to 6, functions in the following way. When the support shaft is put into rotation, the cord drives 78,78' are wound or unwound on the support shaft, depending upon the rotational direction of the *support* shaft, as best shown in FIG. 5, and the cord drives will be arranged in one single layer, because the support shaft simultaneously is being displaced laterally by means of the screw spindle 28 standing in engagement with the threaded drive member 24 mounted at the end of the support shaft as shown in FIG. 4. Simultaneously, the loop 100 will follow the support shaft 16 in the one or in the other direction, depending upon the rotational direction of the support shaft, until one of the stoppers 106 hits and is biased against the underside of the [profile element] *base plate* 6, simultaneously as the slats of the blind are pivoted to a closed position of the blind in the one or in the other direction. At the moment when one of the stoppers 106 hits the underside of the [profile] *base plate* 6, the stopper 106 and/or the slide ring 92 will slide on the *support* shaft 16. When it is desirable to position the slats in a more or less horizontal position, the support shaft is put into a very short rotational movement in the opposite direction, having the effect that the loop 100 will follow the support shaft through a slight movement in the opposite direction, such that the slats may be put into a horizontal position or in any other desirable angular position. When using a slide ring, the loop may be attached to the slide ring. When it is desired to hoist up the blind completely, one initiates the required winding action of the support shaft, whereby the slats at the end of the hoisting movements will be stacked together to a package positioned below the base plate 6 of the profile element. In order to prevent that the support shaft continues to rotate subsequent to the blind having been completely hoisted up and stacked together, a friction coupling is suitably provided between the support shaft and the drive means, which may be a manual device or an electric device. The special novelty in this technical design is that a venetian blind can be operated, i.e. be lifted and lowered, as well as being angularly positioned, by one single manueuvering, namely the support shaft 16.

Figure 7:
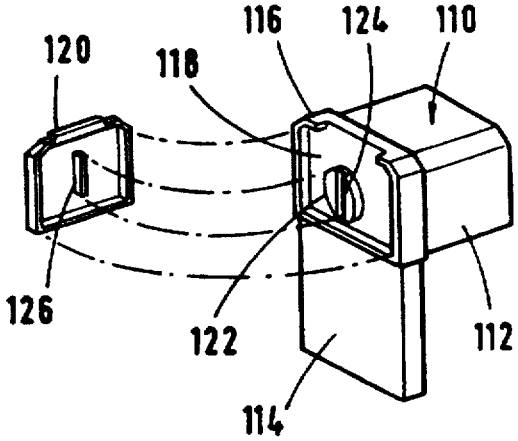
FIG. 7 is a perspective detail view, shown in an enlarged scale, of a special corner key on the profile element for mounting the cord drive mechanism.

FIG. 7 is in an enlarged scale showing a perspective view of a preferred embodiment of a corner key 110 to be used in connection with the special two-part profile element, which is used for assembling the cord drive systems in accordance with the invention. The corner key 110 is provided in the shape of an angular profile element, having an upper arm 112, adapted for being pushed into the profile element when the same is assembled, and a lower arm 114 pushed into the spacer element on the other side of the window (not shown). The corner section 116 of the corner key is provided with a recess 118 adapted to receive a cover 120 for covering the outside end 122 of the [transition] *extension* shaft 43 (see FIG. 1), which is provided with a suitable engagement means 124, adapted to be coupled to an electric motor or a manual drive mechanism. The cover is on the inside provided with a finger 126 adapted for engagement with the drive means 122, so that the support shaft 16 with the cover cannot rotate during storage and transport.

A blind in accordance with the invention can be operated either by means of an external drive means, which can be operated manually, or by means of an electric motor. [An] *As described above, the extension shaft 43 is provided with engagement means 124 (FIG. 7) for engagement with such external drive means for operating the blind. Alternatively, rather than using external drive means, the blind of the invention can be used with an* electric motor [can, however,] *which can* be realized as an integrated part 130 of the support shaft such as indicated at the right side of FIG. 1. The right side of the support shaft including the motor can be mounted to be not rotatable at the right corner key, simultaneously as the drive shaft of the motor (not shown) is put into engagement with one end of the adjacent end part of the support shaft. The wire 132 for supply of electric power to the motor can be arranged out through the right corner key and extend to an electric power source, for instance a battery or to the regular city power wiring.

I claim:

1. A blind adapted for installation between the glass panes in an insulating glass window, the glass panes spaced apart with spacer elements positioned around the circumference of the window and including an upper transversely extending spacer element and space-apart side spacer elements, the blind comprising at least one winding shaft including, as a unit, supporting and drive means therefor; at least two sets of blind supporting and winding cords connected in laterally spaced relationship to the *winding* shaft; and a housing in which the winding shaft is mounted and confined, said housing comprising the upper transversely extending spacer element, said housing specifically including a two-part assembly of, firstly, a lower, substantially plate-shaped member cooperating to support the winding shaft [unit] and, secondly, a substantially U-shaped upper cover member sealingly connected to said first member and sealingly confining the winding shaft [unit] between the said two members, said housing also including two corner spacer elements attached to opposite ends of said first and second members, each of which corner spacer elements being attached to the respective adjacent side spacer element on each side of the window, wherein each of said corner spacer elements is a right angled, profiled element having two arms, one of which is sealingly connected to the end of the two-part spacer element, the other end of said corner piece being attached to the top of the respective side spacer element, and wherein at least one of said corner spacer elements is provided with a supporting bearing for rotatably receiving one outer end of the winding shaft.

2. The blind in accordance with claim 1, wherein the end of said winding shaft extends laterally through said at least one of said corner spacer elements and is configured to be connected to driving means located on the outside of the window.

3. The blind in accordance with claim 1, wherein said winding shaft includes at least one electrical motor for rotational driving of the winding shaft in either direction, said at least one electrical motor being provided with wiring means extending outside the window and configured to be connected to an electrical power source located outside the window.

4. The blind in accordance with claim 1, wherein said corner spacer elements are telescopically connected to the respective outer ends of the first and second housing members.

5. The blind in accordance with claim 1, wherein at least the horizontally extending arm on each of said corner spacer elements is configured to be insertably connected into the adjacent opening defined by the sealingly connected first and second housing members, and is sealingly connected to said first and second housing members.

6. The blind as in claim 2 wherein said one corner spacer element includes means for sealing said extended winding shaft end.

7. The blind as in claim 1 wherein said winding shaft includes a built-in electric driving motor.

*8. A sealed insulating glass window with a blind installed between the glass panes of the window, the glass panes spaced apart with spacer elements positioned around the circumference of the window and including an upper transversely extending spacer element and spaced-apart side spacer elements, the blind comprising:*

*a winding shaft including, as a unit, supporting and drive means therefore;*

*at least two sets of blind-supporting and winding cords connected in laterally spaced relationship to said winding shaft;*

*a housing in which the winding shaft is mounted and confined, said housing comprising the upper transversely extending spacer element, said housing also including two corner spacer elements attached to opposite ends of said housing, each of said corner spacer elements being attached to a respective adjacent side spacer element on each side of the window, and wherein at least one of said corner spacer elements is provided with a supporting bearing for rotatably receiving one outer end of the winding shaft;*

*a winding shaft extension; and*

*wherein said at least one of said corner spacer elements comprises sealing means for receiving said winding shaft extension therethrough, said winding shaft extension being supported for rotation by said sealing means, one end of said winding shaft extension being operatively connected to said one outer end of the winding shaft and another end of said winding shaft extension extending laterally through said at least one of said corner spacer elements and being configured to be connected to driving means located on the outside of the window.*

*9. A sealed insulating glass window in accordance with claim 8, wherein said housing includes a two-part assembly of a lower substantially plate-shaped member cooperating to support said winding shaft, said plate-shaped member having longitudinally extending engagement means on opposite sides thereof, and a substantially U-shaped upper cover member having means for mating engagement with said plate-shaped member engagement means, said plate-shaped member and U-shaped upper cover member cooperating to confine the winding shaft therebetween.*

*10. A sealed insulating glass window in accordance with claim 8, wherein each of said corner spacer elements is a right-angled, profiled element having two arms, one of said arms being horizontally extending for attachment to an end of said housing, another of said arms being vertically extending for attachment to a top of said respective adjacent side spacer element.*

*11. A sealed insulating glass window as claimed in claim 8, wherein said corner spacer elements are telescopically connected to respective outer ends of said housing.*

*12. A sealed insulating lass window as claimed in claim 10, wherein said corner spacer elements are telescopically connected to respective outer ends of said housing.*

*13. A sealed insulating glass window in accordance with claim 9, wherein each of said corner spacer elements is a right-angled, profiled element having two arms, one of said arms being horizontally extending for attachment to an end of said housing, another of said arms being vertically extending for attachment to a top of said respective adjacent side spacer element.*

*14. A sealed insulating glass window as claimed in claim 13, wherein at least said horizontally extending arm on each of said corner spacer elements is configured to be received into an adjacent opening defined by said plate-shaped member and said U-shaped upper cover member.*

* * * * *